United States Patent
Burberry

(10) Patent No.: US 10,313,592 B1
(45) Date of Patent: Jun. 4, 2019

(54) AIRFOIL PAYLOAD STABILIZER

(71) Applicant: Vance Burberry, Playa Del Rey, CA (US)

(72) Inventor: Vance Burberry, Playa Del Rey, CA (US)

( * ) Notice: Subject to any disclaimer, the term of this patent is extended or adjusted under 35 U.S.C. 154(b) by 0 days.

(21) Appl. No.: 15/608,644

(22) Filed: May 30, 2017

(51) Int. Cl.
*G03B 17/56* (2006.01)
*H04N 5/232* (2006.01)
*G03B 17/08* (2006.01)
*F16M 11/04* (2006.01)
*F16M 13/00* (2006.01)
*F16M 11/10* (2006.01)

(52) U.S. Cl.
CPC ......... *H04N 5/23264* (2013.01); *G03B 17/08* (2013.01); *G03B 17/561* (2013.01); *F16M 11/04* (2013.01); *F16M 11/041* (2013.01); *F16M 11/10* (2013.01); *F16M 13/00* (2013.01); *G03B 17/56* (2013.01)

(58) Field of Classification Search
CPC ...................................... G03B 17/56
USPC ......................................... 396/419
See application file for complete search history.

(56) References Cited

U.S. PATENT DOCUMENTS

| | | | | |
|---|---|---|---|---|
| 3,227,804 A | * | 1/1966 | Johnson | E21B 47/0001 175/40 |
| 3,425,383 A | * | 2/1969 | Scherer | B63B 1/30 114/282 |
| 3,838,434 A | * | 9/1974 | Hughes | G03B 17/08 396/27 |
| 4,151,424 A | * | 4/1979 | Bailey | F03D 3/002 290/43 |
| 4,191,461 A | * | 3/1980 | Mittleman | G03B 17/08 396/28 |
| 4,661,013 A | * | 4/1987 | Jenkins | E02B 3/023 405/15 |
| 5,027,139 A | * | 6/1991 | Varouxis | G03B 15/03 396/28 |
| 5,078,639 A | * | 1/1992 | Kippen | A63H 27/00 446/34 |

(Continued)

FOREIGN PATENT DOCUMENTS

| CA | 2846851 A1 | 9/2014 | |
|---|---|---|---|
| CA | 2846851 | * 9/2015 | ............... E04H 4/14 |

*Primary Examiner* — Clayton E Laballe
*Assistant Examiner* — Kevin Butler
(74) *Attorney, Agent, or Firm* — Townsend & Lockett, LLC

(57) ABSTRACT

A buoyant airfoil stabilization platform that can compensate for fluid flow above, below, and around an attached payload. The airfoil stabilization platform being a substantially delta or linear shaped airfoil. The airfoil uses fluid dynamics principles to assist in the stability of a mounted payload. The airfoil stabilization platform also comprises a payload mount and a handle grip. The payload mount is designed to receive camera, lighting, sonar, and other devices. The handle grip allows the user to control and assist in the stabilization of the platform. The handle grip can further contribute to the stabilization of the platform by including components for allowing the center of gravity or buoyancy of the apparatus to be adjusted. The airfoil stabilization platform can further include winglets to assist with stabilizing the platform. In addition, lights, camera, lasers, levels, and other features may be built into the airfoil, winglets, or attached expansion pods.

22 Claims, 12 Drawing Sheets

(56) References Cited

U.S. PATENT DOCUMENTS

| | | | | |
|---|---|---|---|---|
| 5,348,253 | A | * | 9/1994 | Gratzer ................ B64C 23/069 |
| | | | | 244/199.4 |
| 7,484,468 | B2 | * | 2/2009 | Russell .................... B63B 1/10 |
| | | | | 114/123 |
| D587,799 | S | * | 3/2009 | Oleson ........................ D23/411 |
| D642,674 | S | * | 8/2011 | Oleson ........................ D23/411 |
| 9,800,786 | B1 | * | 10/2017 | Wei ...................... G03B 17/568 |
| 2009/0162197 | A1 | * | 6/2009 | Klemo ................ F04D 25/088 |
| | | | | 416/1 |
| 2010/0025541 | A1 | * | 2/2010 | Houck, II ............... B64C 11/00 |
| | | | | 244/34 A |
| 2010/0185346 | A1 | * | 7/2010 | Surmont .................. B64B 1/06 |
| | | | | 701/4 |
| 2012/0049010 | A1 | * | 3/2012 | Speer .................... B64C 23/065 |
| | | | | 244/45 R |
| 2013/0026304 | A1 | * | 1/2013 | Wang ................ B64C 29/0033 |
| | | | | 244/7 R |
| 2013/0026305 | A1 | * | 1/2013 | Wang ................ B64C 29/0033 |
| | | | | 244/7 R |
| 2015/0037164 | A1 | * | 2/2015 | Fizer .................... F04D 29/384 |
| | | | | 416/223 R |
| 2015/0158578 | A1 | * | 6/2015 | Guida ................ B64C 23/065 |
| | | | | 244/199.4 |
| 2015/0205187 | A1 | * | 7/2015 | Preciat Cervera ... G03B 17/561 |
| | | | | 348/211.2 |
| 2016/0173741 | A1 | * | 6/2016 | Wolfenbarger ........ G03B 17/08 |
| | | | | 348/81 |
| 2017/0029088 | A1 | * | 2/2017 | Gruner ..................... B64C 3/26 |

* cited by examiner

AIRFOIL PAYLOAD STABILIZER

FIELD OF THE INVENTION

The invention relates to a stabilized platform for supporting devices underwater including cameras, sonar, telescopic lenses, antennas, and other devices. More particularly, the invention relates to a self-leveling, stabilized platform for mounting cameras in underwater applications.

BACKGROUND OF THE INVENTION

When using cameras in underwater applications it is often necessary for the camera to be stabilized in some manner. The push and pull of an ocean, river, lake, or water currents in general, makes it very difficult to capture stable images while the camera is submerged in water. Prior art systems include hand held camera mounts which relied on the physical strength of the photographer to hold the camera platforms stable and were not designed to compensate for the fluid dynamics associated with underwater currents.

It is often desirable in underwater photography or videography to submerge a camera incased in a water proof apparatus that is mounted to a handle so that it can be held and controlled by a photographer or videographer. In such instances the submerged camera may be slowly moved through the water above the seabed, riverbed, lakebed, or ocean bottom (herein after, ocean bottom). The camera movement can also be stopped so that the camera can be positioned adjacent to an object being viewed. The weight of such a submerged camera in water may be relatively small and in many instances, may be only a few ounces. Such an effective, light-weight camera attached to a hand-held mount is readily subject to undesirable movement caused by underwater currents, motion of passing sea life, or motion caused by non-uniform, irregular changes in tension applied to the hand-held mount by the user. The light-weight of the camera may also offset the center of gravity of the camera mount, causing it shift up or down in response to the currents. Terrain conditions at the ocean bottom may also affect movement of the camera.

It will be apparent that under such conditions as mentioned above, that the picture captured by the camera will rarely be a steady picture capable of being carefully studied and examined because of the uncertain irregular movement of the camera in the water. Prior proposed means for stabilizing an underwater camera have included various devices that focused on the handles that the user held to support the camera. Such prior proposed stabilizing devices included several disadvantages in that the user's movements also contributed to stabilization problems with the camera. The handles also added bulkiness and weight which shifted the center of gravity of the apparatus under water. These prior art devices did not solve the problem of stabilizing the camera platform, which is critical for capturing useful footage and images.

The present invention meets one or more of the above-referenced needs as described herein in greater detail.

SUMMARY OF THE INVENTION

The present invention contemplates a novel construction of a stabilizing device for a submerged body, particularly an exemplary camera body, wherein the camera is both stabilized (that is, irregular motion eliminated or reduced to a minimum) in its movement through the water and is stabilized when it comes to a position of rest or immobility either on the seabed, riverbed, lakebed, or ocean bottom (herein after, ocean bottom) or at a selected spaced, distance above the ocean bottom. The stabilizing device of the present invention contemplates a simple effective structure, which has been found to effectively steady a submerged camera body against water currents and to compensate for changes in the center of gravity when the camera and stabilization platform are submerged. The present invention contemplates a stabilizing device which may be readily attached to the camera body and which, can include a swept back, buoyant delta winged airfoil member. The airfoil member having leading and trailing edges of varying dimensions to allow for fluid dynamic principles to assist in the stability of the stabilizing platform, and thus, the stability of the camera. The airfoil member having a lower surface with a handle receptacle along the center line of the root of the airfoil member for securing the airfoil member to a proximal end of a tubular member. The tubular member having a distal end with a handle grip so that it can be held and controlled by a user. An upper surface of the airfoil member comprising a camera mounting receptacle along the center line of the root of the airfoil member for securing a mounted camera. The airfoil member may further comprise winglets at each of its distal ends so that adequate lateral and longitudinal stability will be imparted to the camera body, not only as the camera body moves through the water, but also when the camera body is held at rest at a selected depth. Briefly described, aspects of the present invention include the following.

In a first aspect of the present invention a stabilization platform that is capable of compensating for fluid flow above, below, and around an attached camera system or other payload is described. The portable airfoil-based payload stabilizer comprises a swept back, delta winged, airfoil member. The airfoil member has a bottom or lower surface with an attached handle receptacle along the center line of the root of the airfoil member. The handle receptacle secures the airfoil member to a proximal end of a handle member. The top or upper surface of the airfoil member comprises an attached payload mounting receptacle along the center line of the root of the airfoil member for securing a mounted payload.

Further within the first aspect of the present invention, the handle member further comprises a tubular shape and a first grip secured at a distal end of the handle member and a receptacle attachment at a proximal end of the handle member. In a further aspect of the present invention, the tubular shaped handle member comprises an enclosed cylinder that is 60-90% filled with a viscous fluid for dynamically changing the center of gravity of the portable airfoil-based payload stabilizer. In still a further aspect of the present invention, the tubular shaped handle member comprises an enclosed cylinder that is 60-90% filled with water for dynamically changing the buoyancy of the portable airfoil-based payload stabilizer. In an even further aspect of the present invention, the tubular shaped handle member is mounted at swept back angle of 1-89 degrees relative to the airfoil member, allowing it to compensate for the center of gravity of the portable airfoil-based payload stabilizer. In still a further aspect of the invention, the tubular shaped handle member is capable to receiving additional weight components for adjusting the center of gravity of the portable airfoil-based payload stabilizer.

In a second aspect of the present invention, the delta winged, airfoil member is neutrally buoyant and water submergible. In a further aspect of the present invention, the delta winged, airfoil member is positively buoyant and water submergible. In a still further aspect of the present invention, the airfoil member can receive external, counter balancing weights along the upper or lower surface of the airfoil member. In a still further aspect of the present invention, winglets are attached at each distal end of the airfoil member. In still a further aspect of the present invention, the winglets are removable and flexibly attached to the distal ends of the delta wing, airfoil member. In a further aspect of the present invention, the winglets comprise a lighting device along a leading or trailing edge of the winglets. In another aspect of the present invention, the winglets comprise a detachable lighting device pod along a leading or trailing edge of the winglets. In another aspect of the present invention, the winglets may be upward or downward biased.

In a third aspect of the present invention, the payload mounting receptacle is motorized to allow 360 degree rotation of the mounted payload via a control. In a further aspect of the present invention, the portable airfoil payload stabilizer incorporates a wired or wireless connection to a mounted payload for remote operation of cameras, lights, the payload mounting receptacle, or other features.

In a fourth aspect of the present invention a portable camera stabilizer that is capable of compensating for fluid flow above, below, and around an attached camera system is described. The portable camera stabilizer comprises a swept back, delta winged, airfoil member. The airfoil member has a bottom lower surface with an attached handle receptacle along the center line of the root of the airfoil member for securing the airfoil member to a proximal end of a handle member. The airfoil member also has a top upper surface with a camera mounting receptacle attached along a center line of the root of the airfoil member for securing a mounted camera.

In a fifth aspect of the present invention, the delta winged, airfoil member is neutrally buoyant and water submergible. In a further aspect of the present invention, the delta winged, airfoil member is positively buoyant and water submergible. In a still further aspect of the present invention, the airfoil member can receive external, counter balancing weights along the upper or lower surface of the airfoil member. In a still further aspect of the present invention, winglets are attached at each distal end of the airfoil member. In still a further aspect of the present invention, the winglets are removable and flexibly attached to the distal ends of the delta wing, airfoil member. In a further aspect of the present invention, the winglets comprise a lighting device along a leading or trailing edge of the winglets. In another aspect of the present invention, the winglets comprise a detachable lighting device pod along a leading or trailing edge of the winglets. In another aspect of the present invention, the winglets may be upwardly or downwardly biased.

The above features as well as additional features and aspects of the present invention are disclosed herein and will become apparent from the following description of preferred embodiments of the present invention.

This summary is provided to introduce a selection of aspects and concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

The foregoing summary, as well as the following detailed description of illustrative embodiments, is better understood when read in conjunction with the appended drawings. For the purpose of illustrating the embodiments, there is shown in the drawings, exemplary constructions of the embodiments; however, the embodiments are not limited to the specific methods and instrumentalities disclosed. In the drawings.

DETAILED DESCRIPTION

Figure 1:
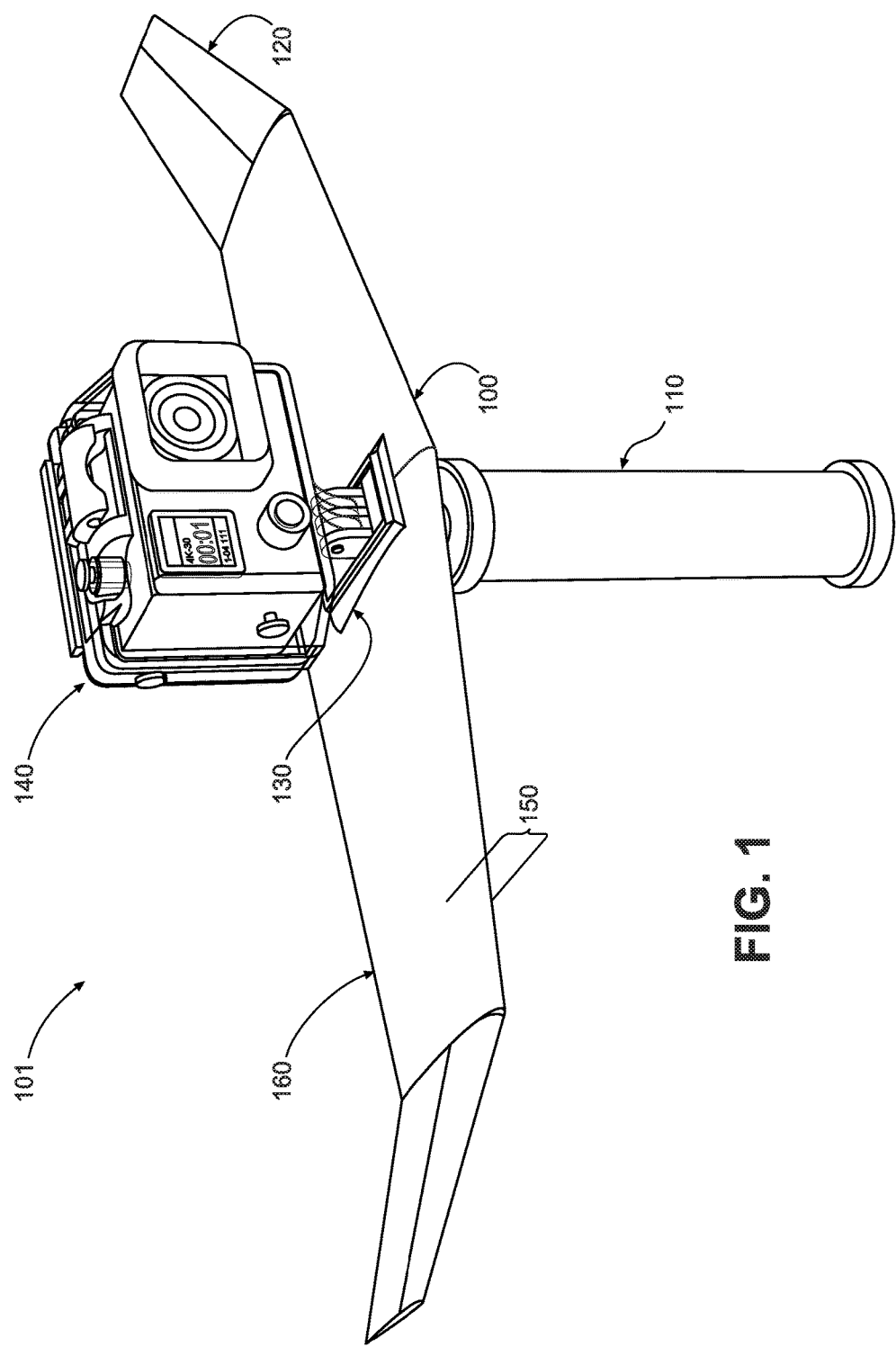
FIG. 1 is a top down, forward view of the airfoil payload stabilizer and attached handle.

Before the present device, methods and systems are disclosed and described in greater detail hereinafter, it is to be understood that the devices, methods and systems are not limited to specific devices, methods, specific components, or particular implementations. It is also to be understood that the terminology used herein is to describe particular aspects and embodiments only and is not intended to be limiting.

As used in the specification and the appended claims, the singular forms "a," "an" and "the" include plural referents unless the context clearly dictates otherwise. Similarly, "optional" or "optionally" means that the subsequently described feature or component may or may not be included, and the description includes instances where the feature or component is included and instances where it is not included.

Throughout the description and claims of this specification, the word "comprise" and variations of the word, such as "comprising" and "comprises," mean "including but not limited to," and is not intended to exclude, for example, other components, integers or steps. "Exemplary" means "an example of" and is not intended to convey an indication of preferred or ideal embodiment. "Such as" is not used in a restrictive sense, but for explanatory purposes.

Disclosed are components that can be used to perform the disclosed device, methods, and systems. These and other components are disclosed herein, and it is understood that when combinations, subsets, interactions, groups, etc. of these components are disclosed that while specific reference to each various individual and collective combinations and permutations of these cannot the explicitly disclosed, each is specifically contemplated and described herein, for all device, methods, and systems. This applies to all aspects of this specification including, but not limited to, combinations of described device components. Thus, if there are a variety of component combinations that can be assembled with the base airfoil device, it is understood that each of the additional component combinations may be used with any of the specific embodiments or combination of embodiments of the disclosed device.

As will be appreciated by one skilled in the art, the methods and systems may take the form of an entirely new hardware embodiment, an entirely new software embodiment, or an embodiment combining new software and hardware aspects. References are made herein to the attached drawings. Like reference numerals are used throughout the drawing to depict like or similar elements of the airfoil payload stabilizer for a camera and camera accessories. For the purposes of presenting a brief and clear description of the present invention, the preferred embodiment will be discussed as a payload stabilizer used to mount a camera and camera accessories while diving underwater. The figures are intended for representative purposes only and should not be construed to be limiting in any aspect.

Figure 2:
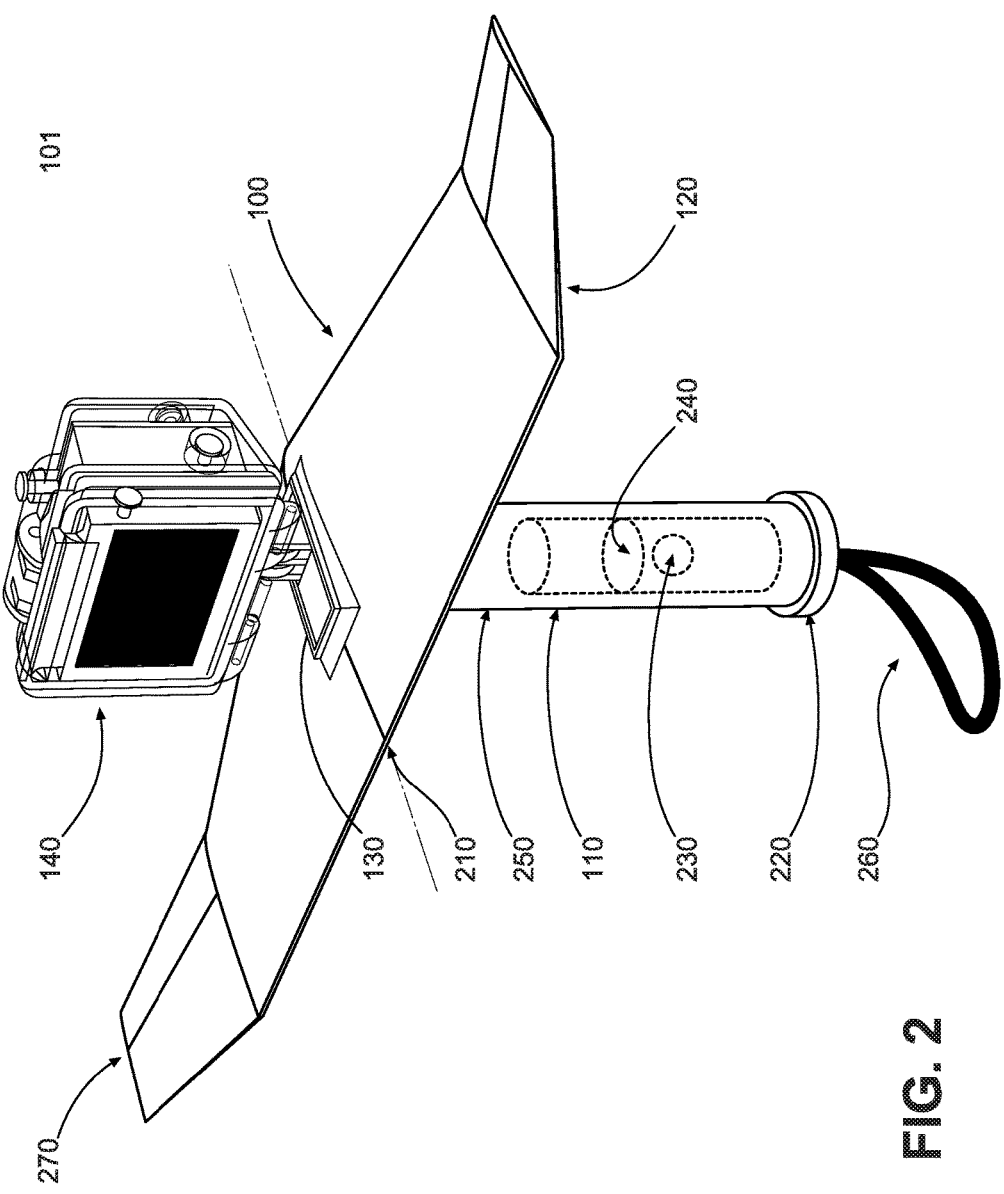
FIG. 2 is a top down, rearward view of the airfoil payload stabilizer with a mounted camera payload attached and attached handle.

Referring now to FIGS. 1 and 2, there is shown a top down, forward and reward perspective views of the present invention, respectively. The present invention consists largely of a delta winged shaped, airfoil stabilization platform 101. The airfoil 100 comprises a leading edge 150 that is substantially curved to allow fluid flow above and below the airfoil 100. The airfoil 100 further comprises a trailing edge 160, that tapers to allow fluid to flow pass the airfoil 100. The airfoil 100 further comprises a buoyant material to offset the negative buoyancy of an attached payload, such as a camera 140. In addition, in an embodiment, the angle of attack of the leading edge 150 is 5 to 10 degrees positive to further add stability to the airfoil stabilization platform 101.

Referring now to FIG. 2, on an upper surface of the airfoil 100, along the center line 210 of the root of the airfoil 100 comprises a payload or camera 140 mounting receptacle 130. The mounting receptacle 130 can accept a camera 140 or other payload.

Further along distal ends of the airfoil 100 are optional fixed, flexible, and/or detachable winglets 120. The winglets 120 have a similar leading and trailing edges that complement the airfoil 100. The winglets 120 may further comprise flexible or adjustable flaps 270 to assist in further stabilizing the airfoil 100. Further referencing FIGS. 1, 2, 8, and 9, in an embodiment the winglets 120, 920 can be upwardly biased and attached to the airfoil 100, 810 via a fixed or adjustable joint 910. In a further embodiment, the winglets 120, 820 can be downwardly biased and attached to the airfoil 100, 810 via a fixed, adjustable, or detachable joint 840.

Figure 3:
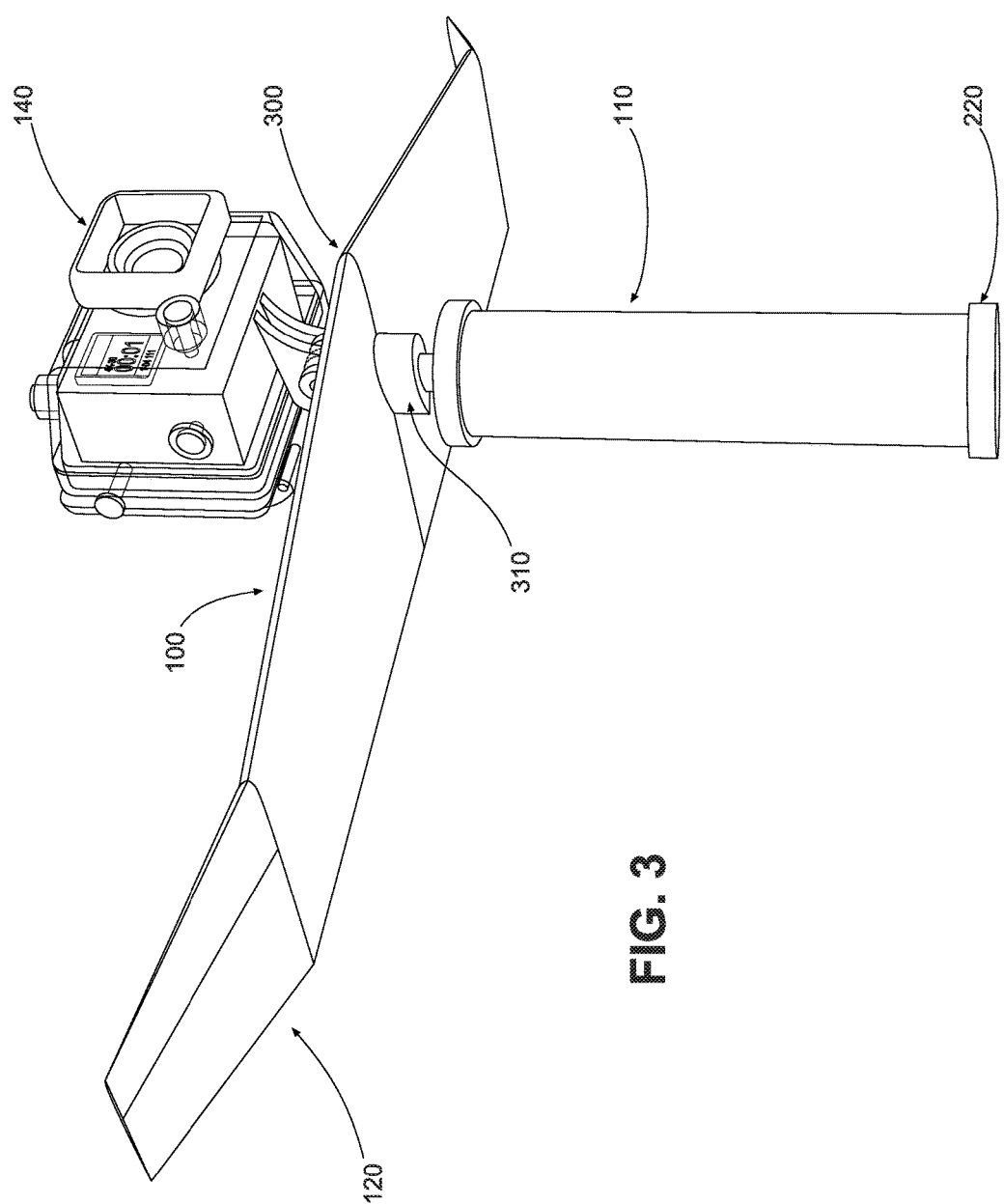
FIG. 3 is a bottom up, forward view of the airfoil payload stabilizer with a mounted camera payload attached and attached handle.

In a further embodiment, referencing FIGS. 1, 2, and 3 along a center line 210, 300 of a lower surface of the airfoil 100, a handle receptacle 310 is attached to the airfoil 100. The handle receptacle 310 is designed to receive a handle 110 that the user grasps to hold the airfoil stabilization platform 101 and attached payload 140 in place. The handle receptacle 310 may allow for fixed, flexible, or detachable handles 110.

In still a further embodiment, referencing FIG. 2, the handle 110 is substantially a hollow tube. The hollow tube handle 110 can be filed with adjustable volumes of air, water, or other viscous fluids 240 to adjust the buoyancy and/or center of gravity of the airfoil stabilization platform 101. In an embodiment, the enclosed hollow tube handle 110 can contain 60-90% viscous fluid for dynamically changing the center of gravity of the airfoil stabilization platform 101. In a further embodiment weights 230 may be inserted into the hollow tube handle 110 to adjust the buoyancy and center of gravity the airfoil stabilization platform 101. The weights 230 can also float in a viscous fluid 240 to further dynamically adjust the center of gravity of the airfoil stabilization platform 101. In another embodiment, additional weights 220 can be attached to the handle to further adjust the center of gravity and buoyancy of the airfoil stabilization platform 101. Furthermore, the handle 100, can be covered in rubber, made of ruff metal, plastic, or an otherwise grip-able material 250, thereby allowing the airfoil stabilization platform 101 to easily be grasped underwater. In an embodiment, the handle 110 can include a leash 260 to prevent the airfoil stabilization platform 101 from floating away from the user. Finally, in embodiment, the handle 110 can contain technical features such as lighting, batteries, gyroscopes, or other additional technical equipment.

Figure 4:
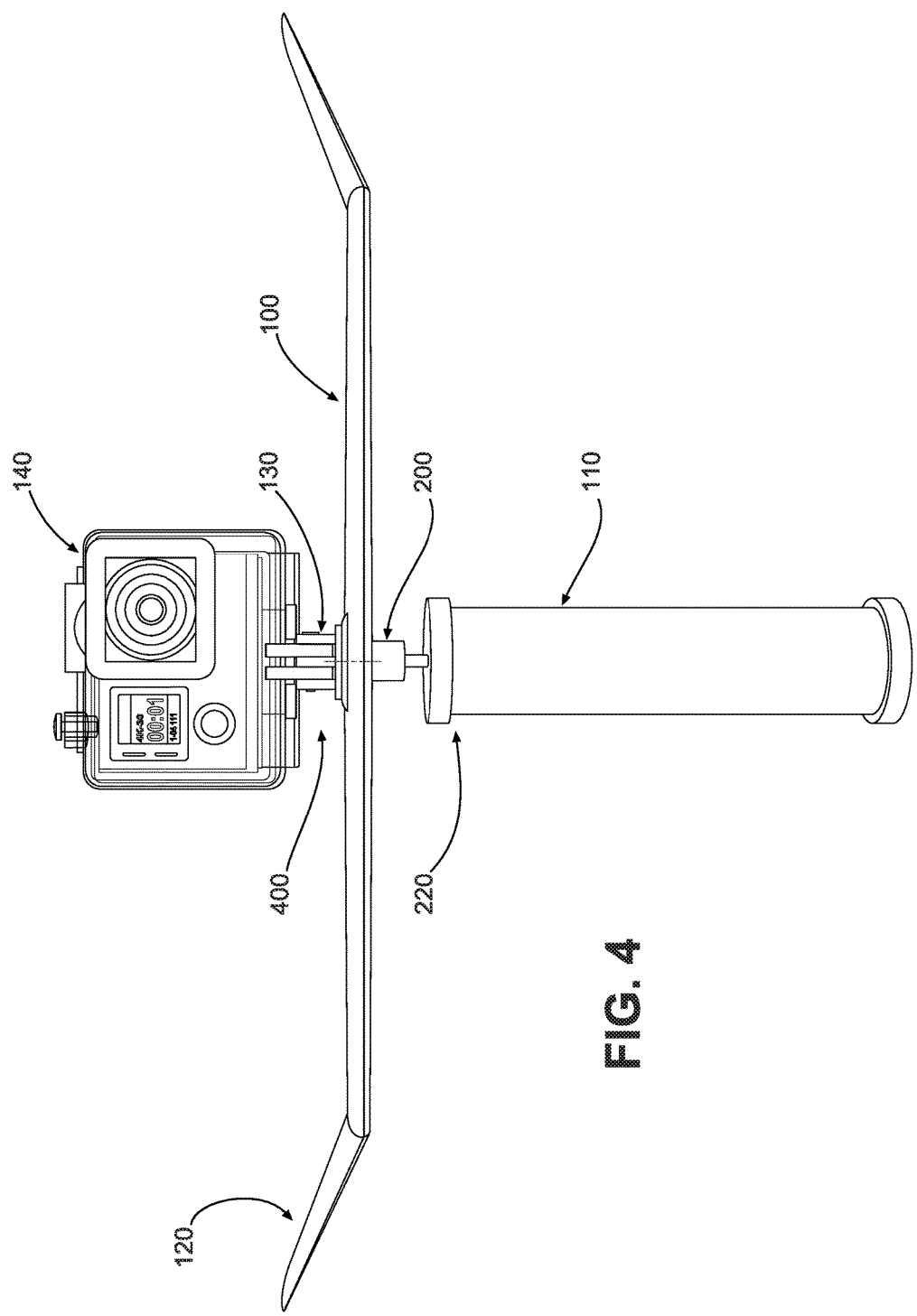
FIG. 4 is a forward center line perspective of the airfoil payload stabilizer with a mounted camera payload attached and attached handle.

Turning now to FIG. 4, a substantially complete airfoil stabilization platform 101 is shown. The airfoil 100 and winglets 120 are substantially swept back creating a substantially delta winged shape. The complete airfoil stabilization platform 101 further comprises the payload mounted receptacle 130 along the center line of the upper surface of the airfoil 100. Similarly, along the center line of the bottom surface of the airfoil 100, comprises a mount for fixedly or detachably receiving a handle 110. In an embodiment, the handle 110 further comprises internal 230, 240, and external weights 220 to allow the buoyancy and center of gravity to be adjustable.

Figure 5:
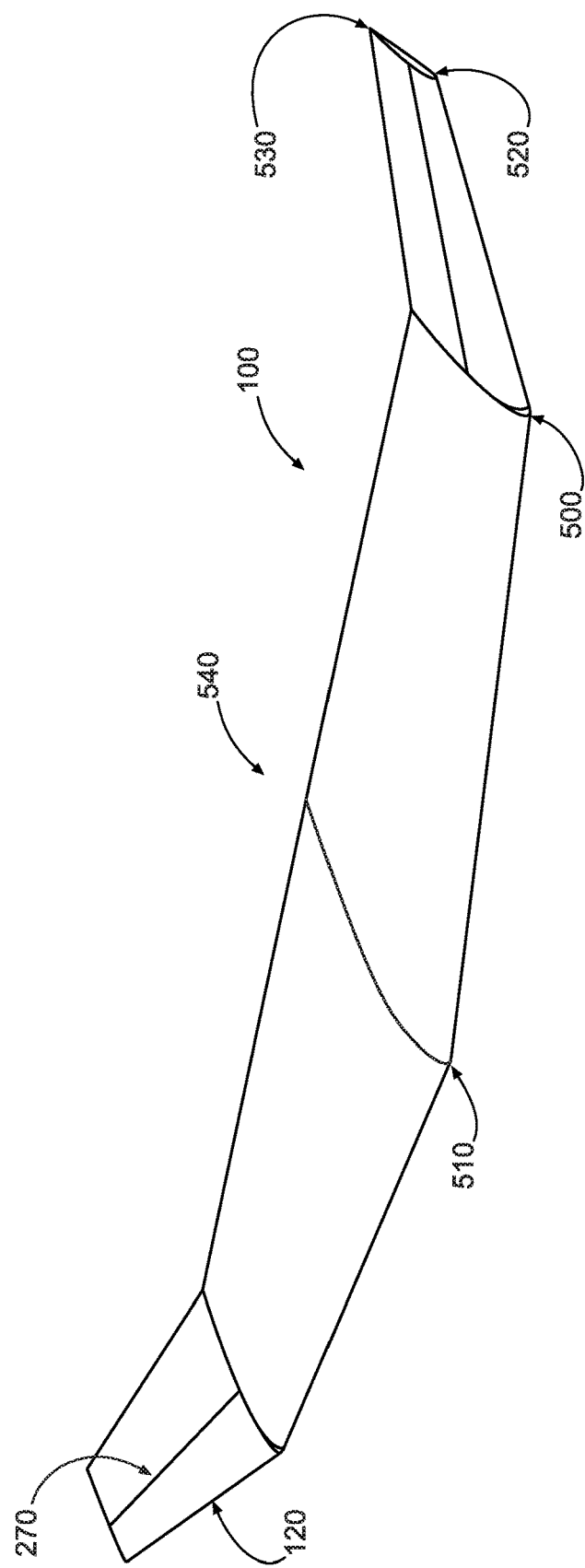
FIG. 5 is a top down, right to left planar perspective of the delta wing airfoil with optional attached upwardly biased winglets.

Turning now to FIG. 5, in an embodiment, the airfoil 100, has a leading edge 510 and a trailing edge 540 for controlling the flow of fluids around the airfoil 100. Similarly, the winglets 120 also have leading edges 520 and trailing edges 530. The angle of attack of the leading edges can be optimized to increase stability of the airfoil stabilizer 100. In a further embodiment, the winglets can be fixed, flexible, or detachably attached to the airfoil stabilizer 100. The winglets 120 may further comprise flexible or adjustable flaps 270 to assist in further stabilizing the airfoil 100.

Figure 6:
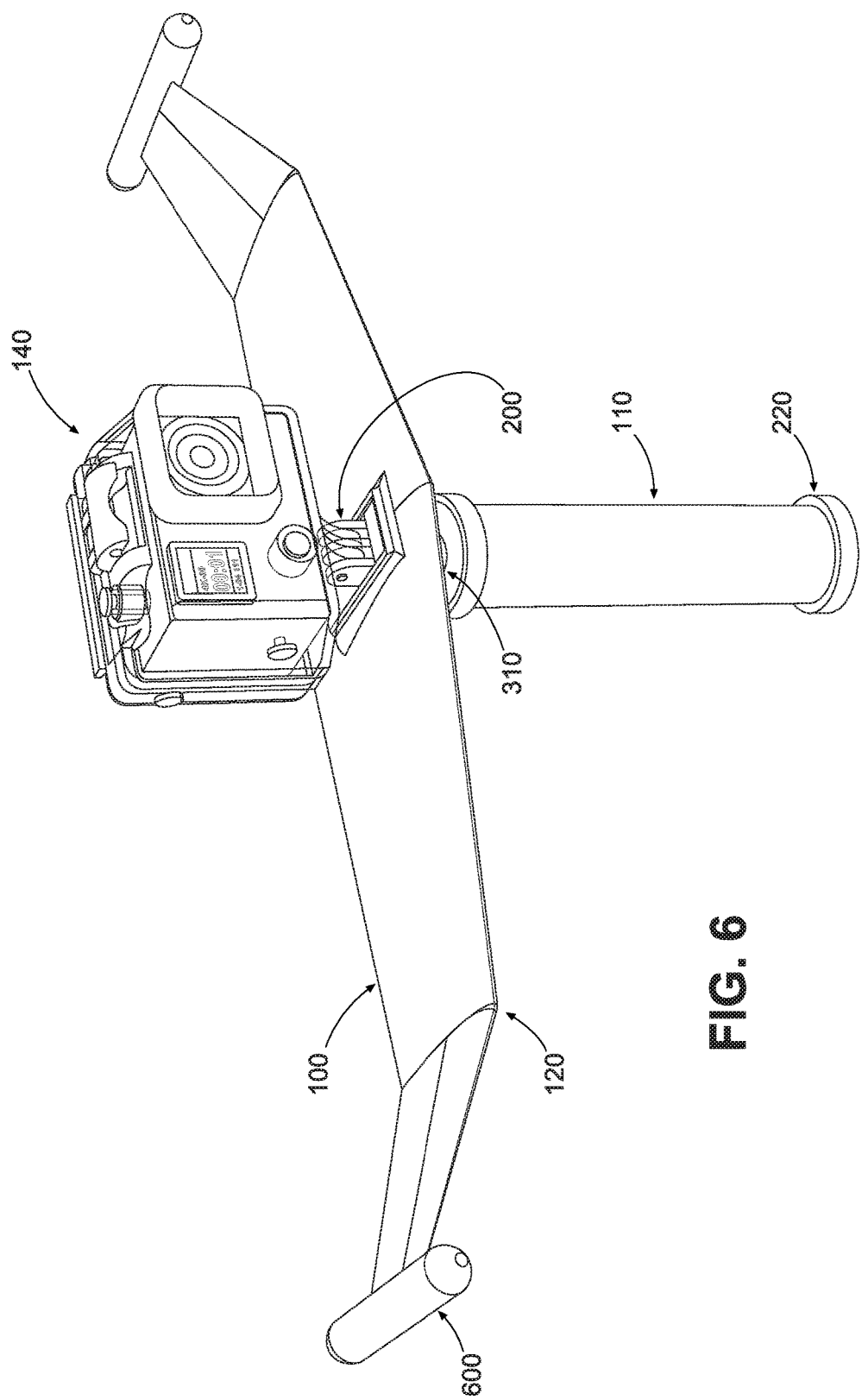
FIG. 6 is a forward perspective of the airfoil payload stabilizer with a mounted camera payload attached, attached handle, and winglets with attached light pods.

Referring to FIG. 6, in a further embodiment, the upper terminal edges of the winglets 120 can hold one or more pods 600. Pods 600 can contain lights, LEDs, cameras, underwater flash, lasers, sonar, or other equipment for assisting the user with underwater work. The Pods 600 can be fixed, flexible, or detachably attached to the upper terminal edges of the winglets 120. In still another embodiment the Pods 600 can be fixed, flexible, or detachably attached to distal, terminal edges of the airfoil 100 or winglets 120. Furthermore, in an embodiment, the Pods 600, may comprise a buoyant material to further increase stability of the airfoil stabilization platform 101.

Figure 7:
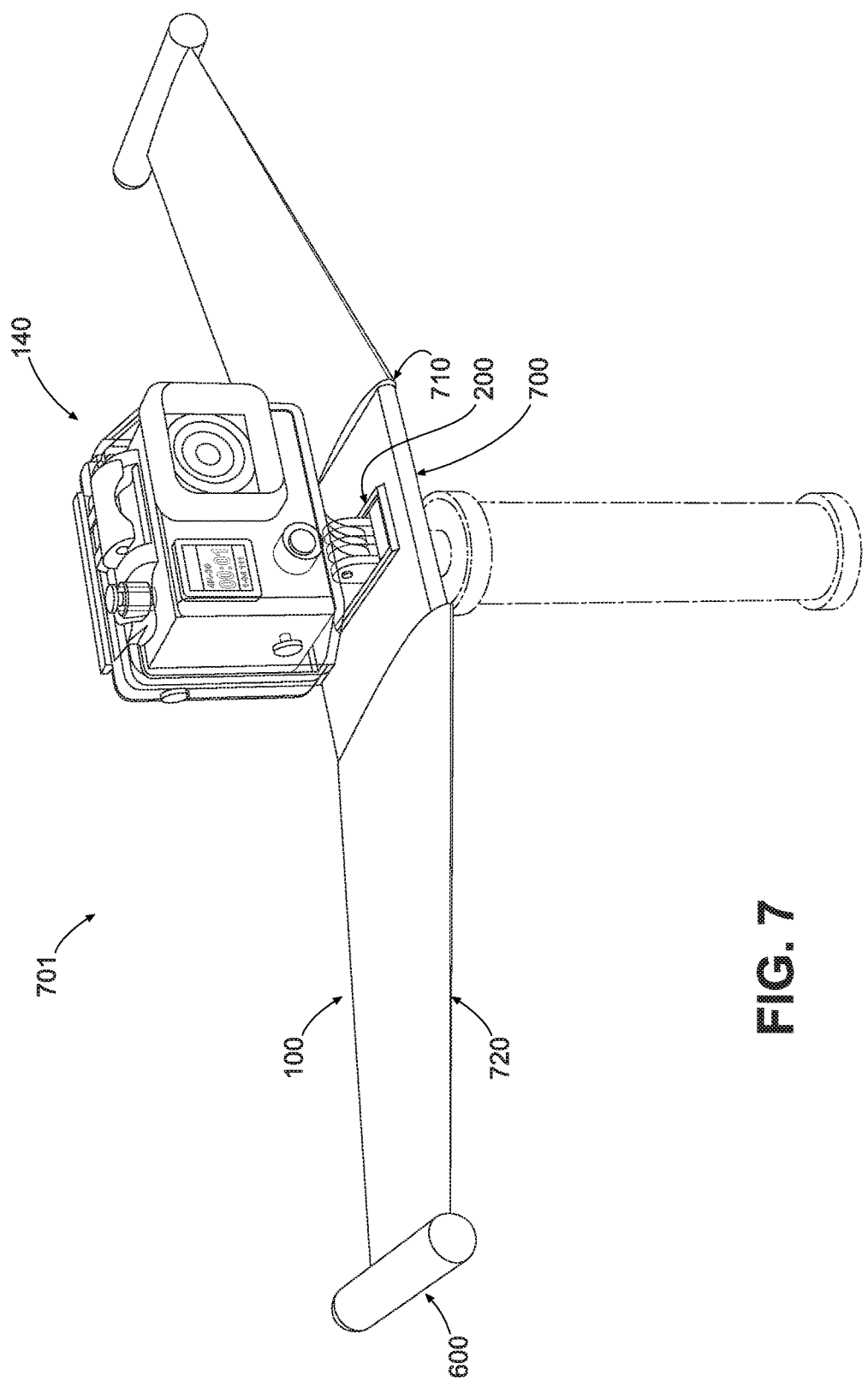
FIG. 7 is a forward perspective of the airfoil payload stabilizer with a mounted camera payload attached, adjustable wings, and light pods attached along distal ends of the adjustable wings.

Turning now to FIG. 7, in an embodiment, the airfoil stabilization platform 701 can comprise individual wings 720, that attach to a base 700. The base 700 can comprise payload mounting equipment 130, 200 for receiving a camera and/or other payload equipment 140. On either side of the base 700, wings 720 can be fixed, flexible, or detachably attached. Furthermore, pods 600 can be fixed, flexible, or detachably attached to the wings 720. Wings 720 can move independently of each other to adjust for fluid flow while still providing buoyancy and stability.

Figure 8:
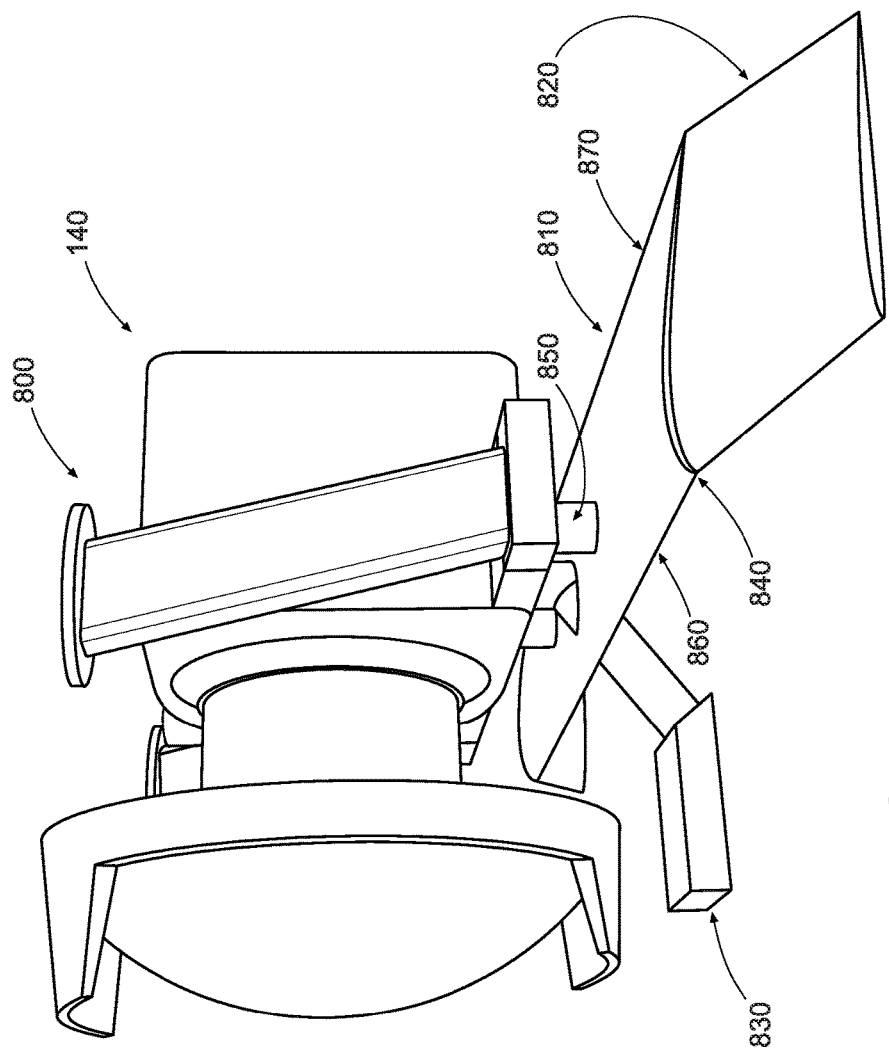
FIG. 8 is a side perspective of the airfoil payload stabilizer with downwardly biased winglets, a lower handle mounted at a tilt angle, with upper handles attached to the payload mount, and a mounted camera payload attached.

FIG. 8 illustrates a further embodiment of the airfoil stabilizer 810. Here the airfoil stabilizer 810 is substantially linear in shape. The linear airfoil stabilizer 810, comprises a front leading edge 860 and a rear trailing edge 870 to manage fluid flow. In an embodiment, its winglets 820 are downwardly biased. Along an upper surface of the airfoil stabilizer 810, a payload mount 850 is attached. The payload mount 850 is substantially "U" shaped, creating handles 800 on either side of an attached payload 140. A camera payload 140 (or other payload) can be mounted between the "U" shaped handles 800. The payload mount 850 can further comprise an attached handle 830 along a lower surface of the airfoil stabilizer 810.

Figure 9:
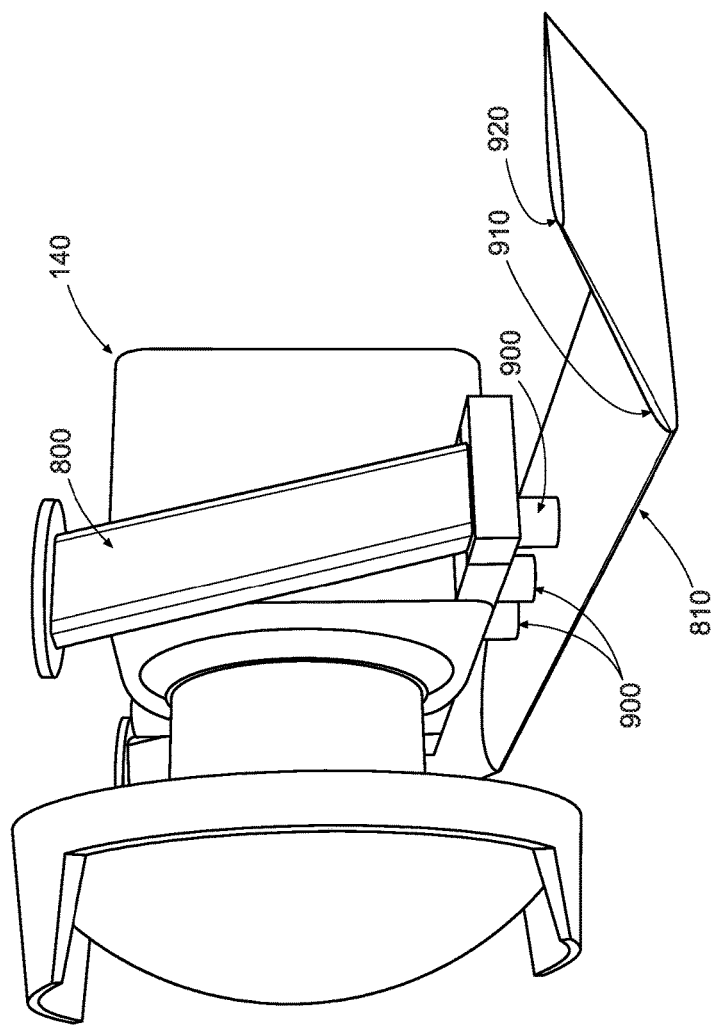
FIG. 9 is a side perspective of the airfoil payload stabilizer with upwardly biased winglets, upper handles attached to the payload mount, and a mounted camera payload attached.

FIG. 9 also illustrates a linear airfoil stabilizer 810. In an embodiment, the airfoil stabilizer 810, comprises a payload mount 800 that is attached to the airfoil stabilizer via a plurality of blades 900. Each of the blades having a forward facing leading edge and rearward facing trailing edge to manage fluid flow. Furthermore, in the embodiment, the winglets have upwardly biased winglets 920. The winglets 920 can be fixed, flexible, or detachably attached via a joint 910 to the linear airfoil stabilizer 810. The handles of the payload mount 800 allows the user to control the linear airfoil stabilizer 810.

Figure 10:
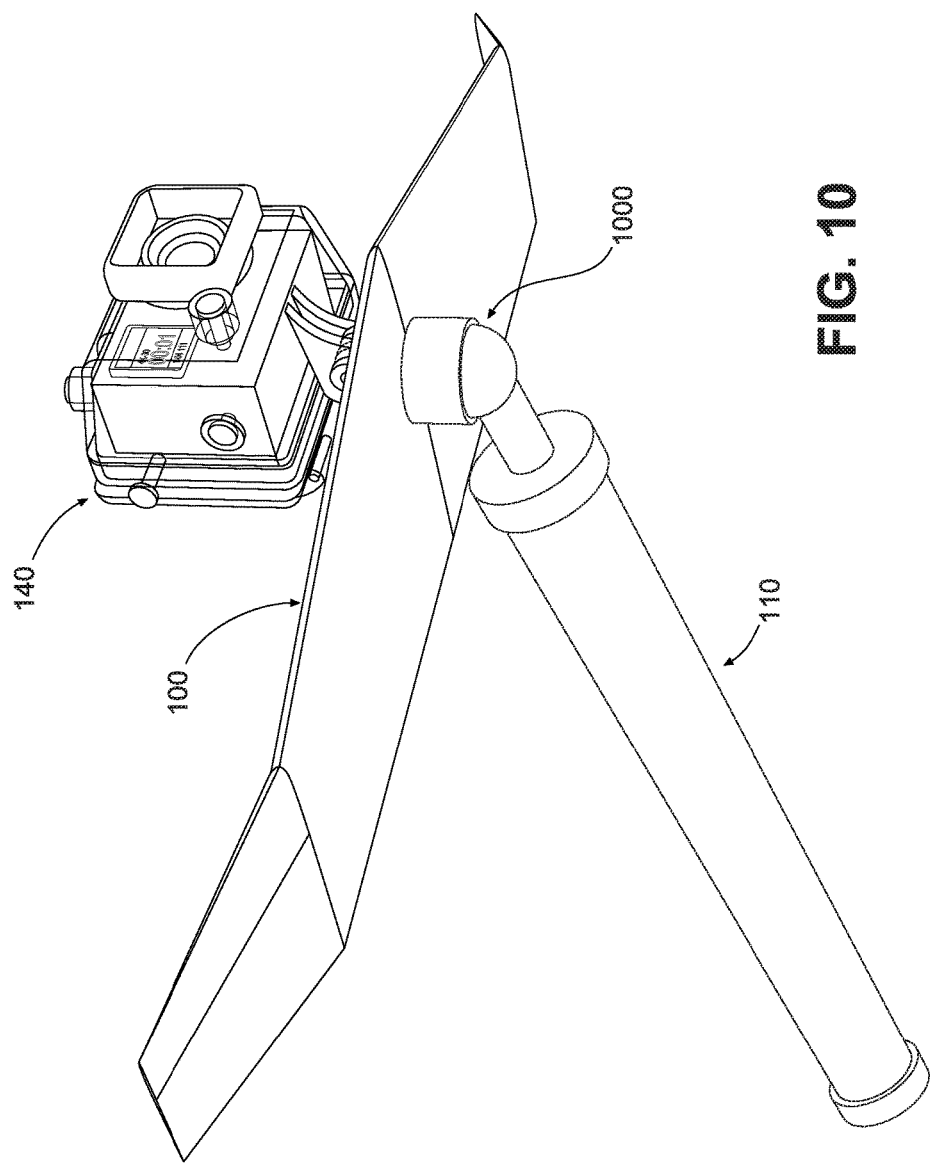
FIG. 10 is a planar view of the airfoil payload stabilizer with a mounted camera payload attached and handle mounted at a tilt angle.
Figure 11:
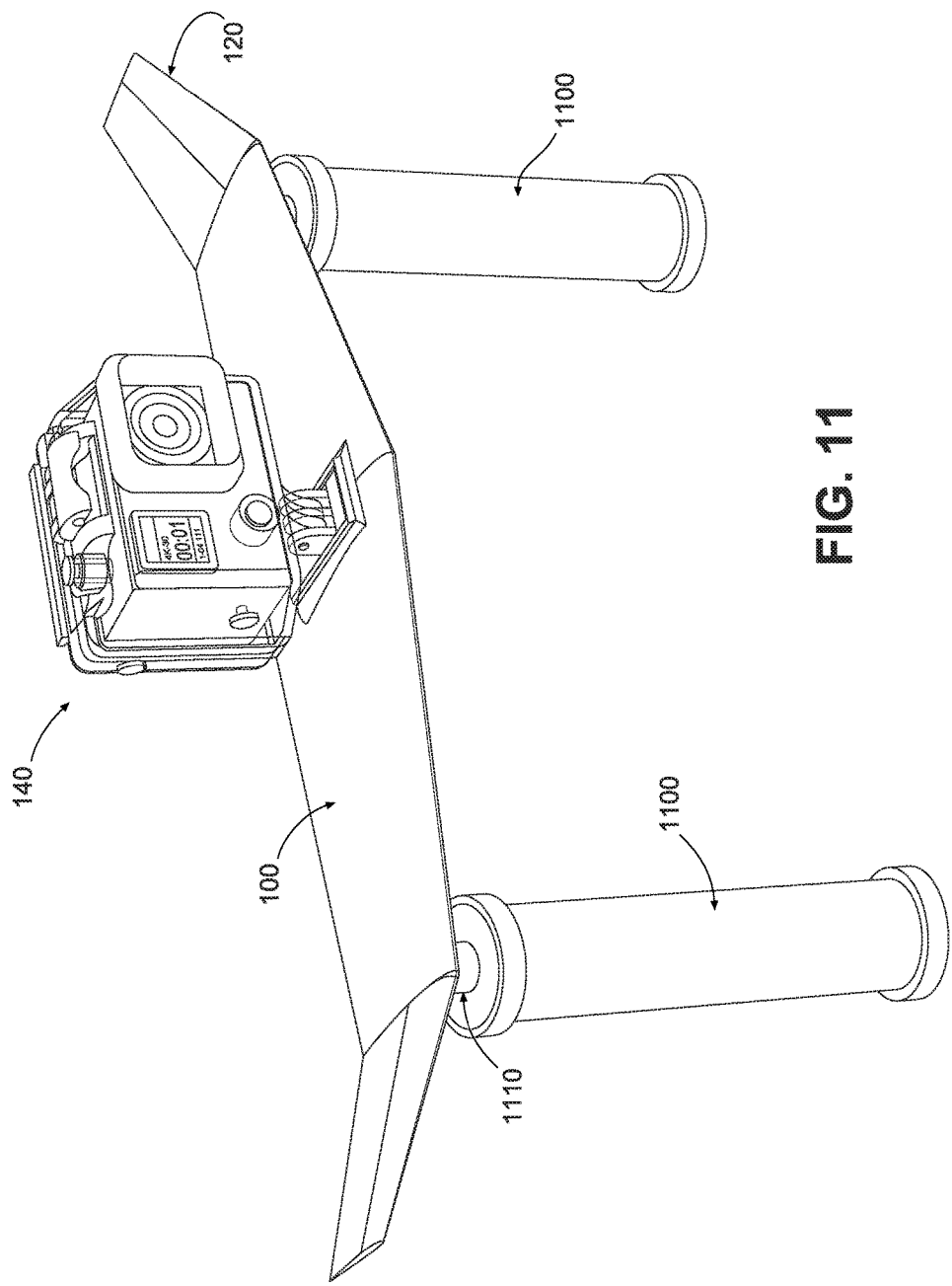
FIG. 11 is a top down forward view of the airfoil payload stabilizer with dual handles and an attached mounted camera.
Figure 12:
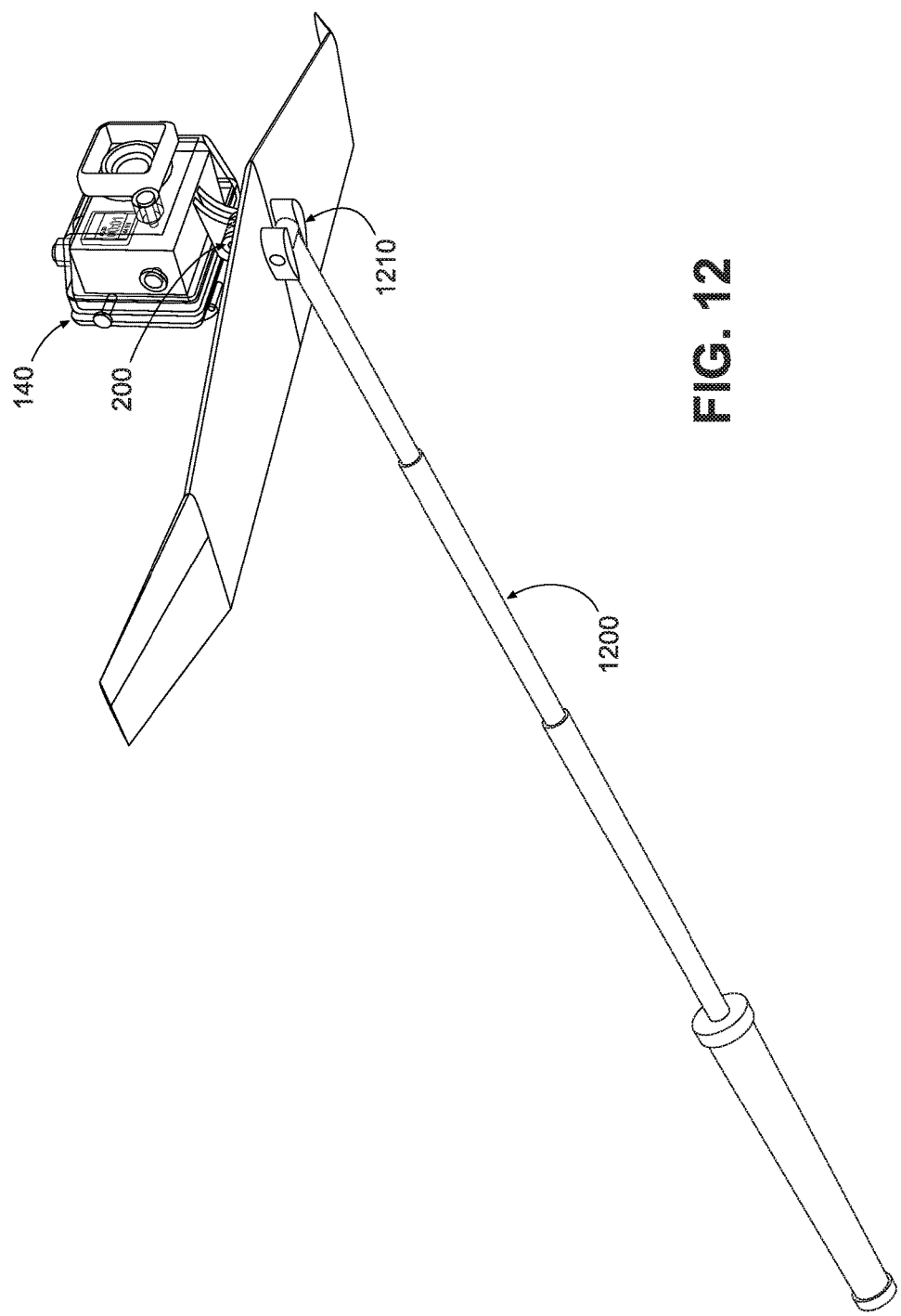
FIG. 12 is a side perspective of the airfoil payload stabilizer with a mounted camera payload attached and a telescopic handle.

Further embodiments are illustrated in FIGS. 10, 11, and 12. Referring now to FIG. 10, the handle 110 can be mounted at a fixed angle or an adjustable tilt angle via a mounting receptacle 1000 to the airfoil 100. In another embodiment, FIG. 11 illustrates an airfoil stabilization platform 101 having two support handles 1100 mounted along a lower surface of the airfoil 101 via mounts 1110. Finally, FIG. 12 illustrates an airfoil stabilization platform 101 having a telescopic handle 1200 mounted along a lower surface of the airfoil 100. The telescopic handle 1200 be adjustably attached to the airfoil 100 via an adjustable attachment mount 1210.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A portable airfoil-based payload stabilizer, comprising:
a swept back, delta winged, airfoil member;
the airfoil member having a lower surface with a handle receptacle member attached along the center line of the root of the airfoil member;
a handle member attached to the handle receptacle member for securing the airfoil member to a proximal end of the handle member;
and an upper surface of the airfoil member comprising a payload mounting receptacle, the payload mounting receptacle mounted along the center line of the root of the airfoil member for securing a mounted payload.

2. The portable airfoil payload stabilizer according to claim 1, wherein the handle member further comprises a tubular shape and a first grip secured at a distal end of the handle member and a receptacle attachment at a proximal end of the handle member.

3. The portable airfoil payload stabilizer according to claim 2, wherein the tubular handle member comprises an enclosed cylinder that is 60-90% filled with a viscous fluid for dynamically changing the center of gravity of the portable airfoil-based payload stabilizer.

4. The portable airfoil payload stabilizer according to claim 2, wherein the tubular shaped handle member comprises an enclosed cylinder that is 60-90% filled with water for dynamically changing the buoyancy of the portable airfoil-based payload stabilizer.

5. The portable airfoil payload stabilizer according to claim 3, wherein the tubular handle member is mounted at swept back angle of 1-89 degrees relative to the airfoil member, allowing it to compensate for the center of gravity of the portable airfoil payload stabilizer.

6. The portable airfoil payload stabilizer according to claim 3, wherein the tubular handle member can receive additional weight components for adjusting the center of gravity of the portable airfoil payload stabilizer.

7. The portable airfoil payload stabilizer according to claim 1, wherein the delta winged, airfoil member is neutrally buoyant and water submergible.

8. The portable airfoil payload stabilizer according to claim 1, wherein the delta winged, airfoil member is positively buoyant and water submergible.

9. The portable airfoil payload stabilizer according to claim 1, wherein the airfoil member can receive external, counter balancing weights along the upper or lower surface of the airfoil member.

10. The portable airfoil payload stabilizer according to claim 1, wherein winglets are attached at each distal end of the airfoil member.

11. The portable airfoil payload stabilizer according to claim 10, wherein the winglets are removable and flexibly attached to the distal ends of the delta wing, airfoil member.

12. The portable airfoil payload stabilizer according to claim 10, wherein the winglets comprise a lighting device along a leading or trailing edge of the winglets.

13. The portable airfoil payload stabilizer according to claim 10, wherein the winglets comprises a detachable lighting device pod along a leading or trailing edge of the winglets.

14. The portable airfoil payload stabilizer according to claim 1, wherein the payload mounting receptacle is motorized to allow 360 degree rotation of the mounted payload via a control.

15. The portable airfoil payload stabilizer according to claim 12, wherein the portable airfoil payload stabilizer incorporates a wired or wireless connection to a mounted payload for remote operation of cameras, lights, the payload mounting receptacle, or other features.

16. A portable camera stabilizer, comprising:
a swept back, delta winged, airfoil member;
the airfoil member having a bottom lower surface with an attached handle receptacle along the center line of the root of the airfoil member for securing the airfoil member to a proximal end of a handle member;
and a top upper surface of the airfoil member comprising a camera mounting receptacle attached along the center line of the root of the airfoil member for securing a mounted camera.

17. The portable camera stabilizer according to claim 16, further comprising wherein the tubular handle member further comprises a first grip firmly secured at a distal end of the tubular member and a receptacle attachment at a proximal end of the tubular handle member.

18. The portable camera stabilizer according to claim 16, wherein the delta winged, airfoil member is neutrally buoyant and water submergible.

19. The portable camera stabilizer according to claim 16, wherein the delta winged, airfoil member is positively buoyant and water submergible.

20. The portable camera stabilizer according to claim 16, wherein winglets are attached at each distal end of the airfoil member.

21. The portable camera stabilizer according to claim 20, wherein the portable camera stabilizer incorporates a wired or wireless connection to a mounted payload for remote operation of cameras, lights, the payload mounting receptacle, or other features.

22. The portable airfoil payload stabilizer according to claim 14, wherein the portable airfoil payload stabilizer incorporates a wired or wireless connection to a mounted payload for remote operation of cameras, lights, the payload mounting receptacle, or other features.

* * * * *